United States Patent

Vernon et al.

Patent Number: 5,865,924
Date of Patent: *Feb. 2, 1999

[54] HEAT SEALING OF THREAD TO A WEB

[75] Inventors: Geoffrey William Vernon, Kenilworth; James Goodwin, Coventry; Andrew Cleall, Radford; Thomas William Bailey, Berkswell, all of England

[73] Assignee: Thomas J. Lipton Co., Division of Conopco, Inc., Englewood Cliffs, N.J.

[*] Notice: The term of this patent shall not extend beyond the expiration date of Pat. No. 5,439,529.

[21] Appl. No.: 806,465

[22] Filed: Feb. 26, 1997

Related U.S. Application Data

[63] Continuation of Ser. No. 433,655, May 4, 1995, abandoned, which is a continuation of Ser. No. 122,034, Sep. 14, 1993, Pat. No. 5,439,529.

[30] Foreign Application Priority Data

Sep. 17, 1992 [GB] United Kingdom .......... 9219657

[51] Int. Cl.$^6$ .................. B29C 65/18; B65B 29/04
[52] U.S. Cl. .................. 156/176; 53/134.2; 53/413; 156/290; 156/311
[58] Field of Search .................. 156/176, 290, 156/311, 554; 493/190, 205, 226, 375; 53/134.2, 413; 426/83

[56] References Cited

U.S. PATENT DOCUMENTS

| | | |
|---|---|---|
| 2,149,713 | 3/1939 | Webber . |
| 2,335,159 | 11/1943 | Salfisberg . |
| 2,468,454 | 4/1949 | Salfisberg . |
| 2,556,383 | 6/1951 | Williams . |
| 2,767,113 | 10/1956 | Bower . |
| 2,791,505 | 5/1957 | Barnett . |
| 2,829,701 | 4/1958 | Keely .................. 156/554 |
| 2,852,389 | 9/1958 | Johnson . |
| 2,861,403 | 11/1958 | Weisman . |
| 2,925,171 | 2/1960 | Eaton . |
| 2,939,257 | 6/1960 | Bartelt . |
| 3,143,834 | 8/1964 | Irmscher . |
| 3,147,168 | 9/1964 | Bateman .................. 493/205 |
| 3,237,550 | 3/1966 | Christopher . |
| 3,283,672 | 11/1966 | Mueller . |
| 3,316,686 | 5/1967 | Welin-Berger . |
| 3,332,204 | 7/1967 | Frank . |
| 4,394,204 | 7/1983 | Hutcheson . |
| 4,415,597 | 11/1983 | Romagnoli . |
| 4,506,490 | 3/1985 | Klar . |
| 4,680,024 | 7/1987 | Focke et al. .................. 493/205 |
| 4,828,851 | 5/1989 | Romagnoli . |
| 4,829,742 | 5/1989 | Romagnoli . |
| 4,909,017 | 3/1990 | McMahon et al. .................. 156/66 |
| 4,961,301 | 10/1990 | Bonomelli . |
| 5,135,762 | 8/1992 | Vernon et al. . |
| 5,366,741 | 11/1994 | Van der Zon . |
| 5,439,529 | 8/1995 | Vernon et al. .................. 156/176 |

FOREIGN PATENT DOCUMENTS

| | | |
|---|---|---|
| 0 448 325 | 9/1991 | European Pat. Off. . |
| 0 489 554 | 6/1992 | European Pat. Off. . |

(List continued on next page.)

OTHER PUBLICATIONS

Derwent Abstract of JP 5044111.

Primary Examiner—Steven D. Maki
Attorney, Agent, or Firm—James J. Farrell

[57] ABSTRACT

A tagged packet carries a tag which is attached to the main body of the packet by a thread. The thread comprises polypropylene so as to be attachable by heat sealing to the body. The body is made up of layers of sheet material also comprising thermoplastic material to allow the body to be closed by heat seals. The thread is secured to the face of the body at one edge at the same time as that edge is heat sealed and the heating for the thread seal is applied from the opposite face of the body whereas the adjacent regions of edge seal spaced from the thread has the heating applied through the first face. This arrangement gives closer control of the different conditions required for securing the thread and for sealing together only the sheet material of the body.

14 Claims, 3 Drawing Sheets

FOREIGN PATENT DOCUMENTS

| | | |
|---|---|---|
| 1 022 960 | 1/1958 | Germany . |
| 1 281 927 | 10/1968 | Germany . |
| 570 798 | 12/1975 | Switzerland . |
| 76205985 | of 0000 | Taiwan . |
| 78200261 | of 0000 | Taiwan . |
| 0 809 573 | 2/1959 | United Kingdom . |
| 0 962 038 | 6/1964 | United Kingdom . |
| 1 541 054 | 2/1979 | United Kingdom . |
| 1 550 381 | 8/1979 | United Kingdom . |
| 2 049 547 | 12/1980 | United Kingdom . |
| 2 052 428 | 1/1981 | United Kingdom . |
| 2 151 214 | 7/1985 | United Kingdom . |
| 2 201 934 | 9/1988 | United Kingdom . |
| 2 202 819 | 10/1988 | United Kingdom . |
| 2 231 023 | 11/1990 | United Kingdom . |
| WO 91/13580 | 9/1991 | WIPO . |
| WO 92/06903 | 4/1992 | WIPO . |
| WO 92/14649 | 9/1992 | WIPO . |
| WO 93/19997 | 10/1993 | WIPO . |
| WO 94/22721 | 10/1994 | WIPO . |

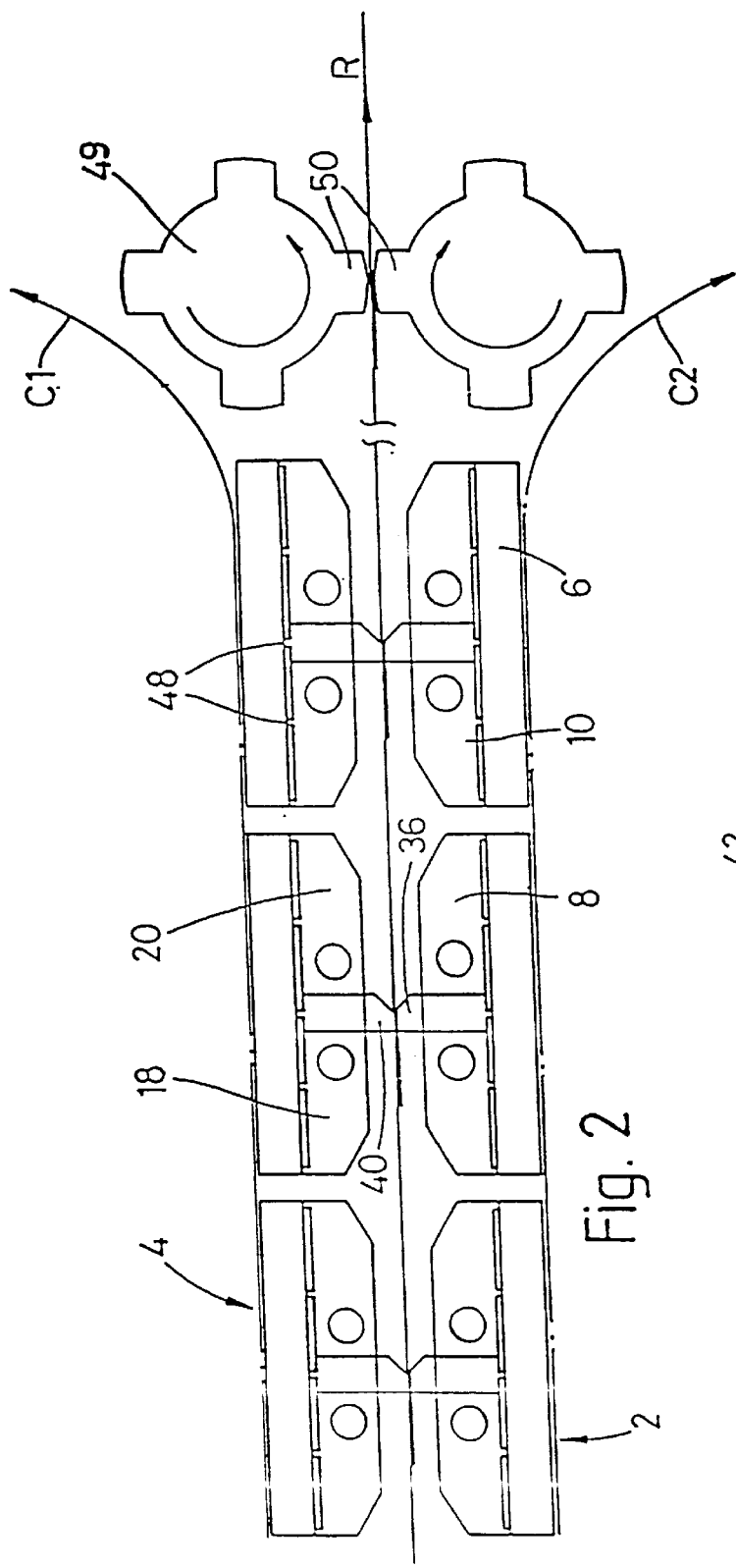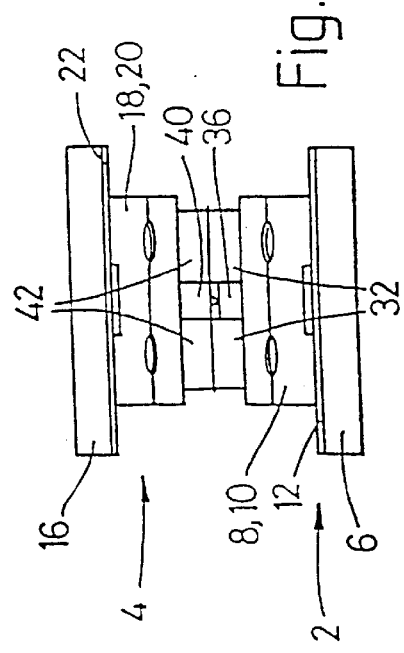

HEAT SEALING OF THREAD TO A WEB

This is a continuation of Ser. No. 08/433,655 filed May 4,1995 and now abandoned which was a continuation of Ser. No. 08/122,034 filed on Sep. 14, 1993 and now U.S. Pat. No. 5,439,529.

BACKGROUND OF THE INVENTION

This invention relates to a method and means for performing heat sealing operations.

The heat sealing of a pair of webs containing thermoplastics material by a pair of clamping jaws, at least one of which is heated, is a well known technique. It is also known to employ threads made of a thermoplastics material which are heated while being pressed into place to secure them by adhesion of the softened material.

While both these processes have been practised successfully in themselves, problems can arise if it is required to secure a thread in place on a heat-sealed seam. The thermoplastic thread if melted may shrink away from the heat sealing device and so be attached, at best, only insecurely. If this does not happen, it may stick to the heating device in contact with it, again giving an insecure attachment but also contaminating the apparatus. The use of threads made of a mixture of thermoplastic and non-thermoplastic materials might avoid these problems but it is found they cannot in any case adhere securely by heat to a paper web.

SUMMARY OF THE INVENTION

According to one aspect of the present invention, a method of attaching a thermoplastic thread to a web is provided in which the thread and web material are held between a pair of opposed heat sealing elements with the thread on one face of the web and heat being applied from the element on the opposite face of the web to render the thread plastic and cause it to adhere to the web material.

It is found, surprisingly, that when employing this method it is possible to avoid sticking of the thread material to either of the heat-sealing elements between which it is held and it is also possible to avoid the material shrinking away from the heat-sealing region in a molten state.

Preferably, the heating step is followed by a step in which pressure and cooling is applied to complete the attachment of the thread. For uniformity of results, it is desirable that this step is performed with the web and thread gripped in a predetermined sized gap.

As applied to a process in which the thread extends along a continuous tubular web which is to be sealed transversely at intervals to define a series of separate compartments and the thread is to be attached to each of the compartments, the transverse seals may be completed at the same time as the attachment of the thread by the use of at least one further pair of sealing elements, which will normally be required to operate at a different temperature and pressure than those for attaching the thread.

The thread may be composed of a single polymer, polypropylene being a preferred material. However, there can be advantages if the thread is composed of a plurality of thermoplastic materials having differing melting points, so that the thread is only partly melted when it is heat sealed in place.

Apparatus according to the invention for attaching a thread at one or more regions intermediate the width of a web and for sealing transversely across the web, may thus comprise a plurality of discrete but contiguous heat-sealing devices for heating successive portions across the width of the web, each said device comprising a heating element and anvil element adapted to be disposed on opposite sides of the web to engage between them the portions of the assembly in the respective zones, means being provided to press the web between the elements at the or each zone other than the zone to be occupied by the thread and said latter zone having the heat-sealing element set at a wider spacing than the opposed elements of the or each other of said zone.

In a further aspect, the invention also includes a method of attaching a thermoplastic thread to a web in which the thread and web material are held between a pair of opposed heat sealing elements with the thread on one face of the web and heat being applied from the element on the opposite face of the web to render the thread plastic and cause it to adhere to the web material.

The invention will be described in more detail by way of example with reference to the accompanying drawings.

BRIEF DESCRIPTION OF THE DRAWINGS

FIG. 2 is a schematic side view of an apparatus according to the invention for producing the packet of FIG. 1, FIG. 3 is a transverse view of the heat sealing devices of the apparatus in FIG. 2.

DESCRIPTION OF THE PREFERRED EMBODIMENT

Figure 1:
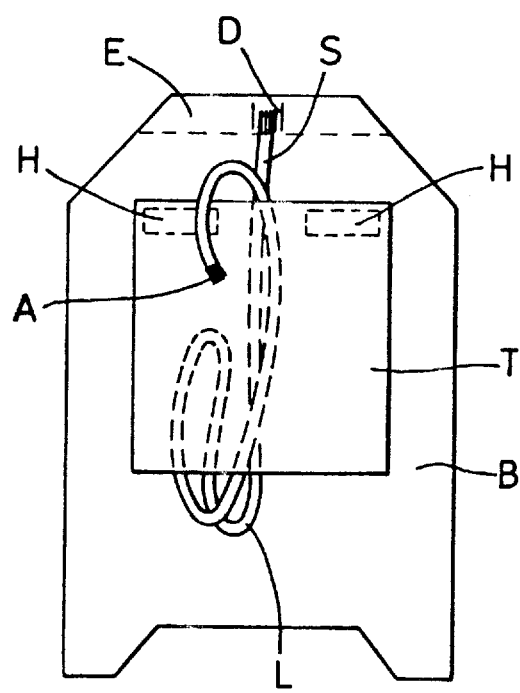
FIG. 1 shows a packet which has been produced using the apparatus to be described.
Figure 4:
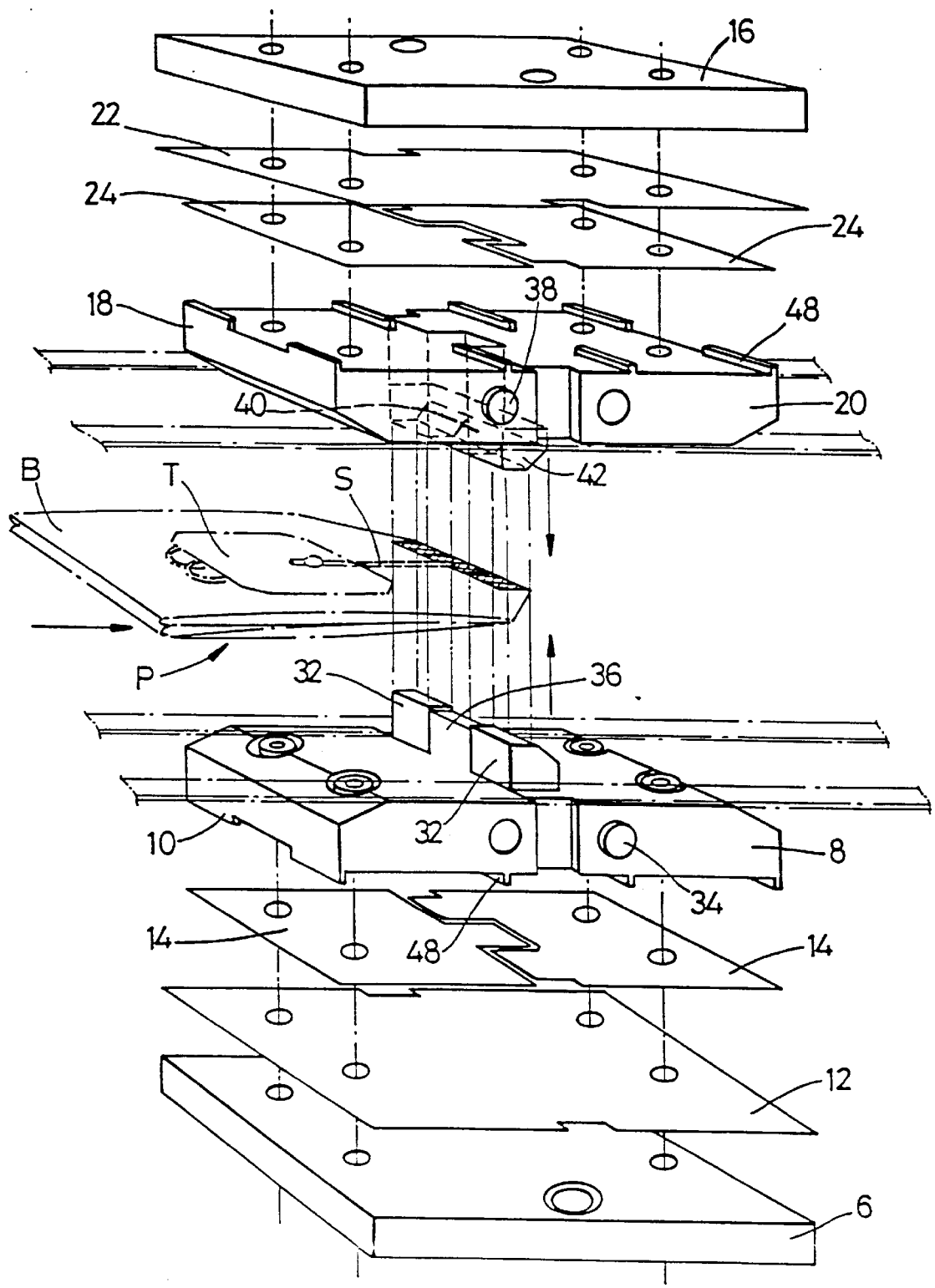
FIG. 4 is an exploded view of the devices of FIG. 3.

The packet illustrated in FIG. 1 has a double-compartmented form described in more detail in EP 448325A but it can take any desired form. It comprises a main body B which is formed from two superimposed webs of a sheet material which may have heat-sealing properties, and which contains, for example, an infusion material. A tag T is loosely tacked by heat seals H to the main body but is attached more securely to it by a heat seal A to a thread S partly gathered in a loop L under the tag. The thread is secured to the body by a heat seal D at one end and that end of the body to be closed by heat-seal E welding the webs together. For this purpose, the thread and the sheet material of the body comprise thermoplastic material, such as polypropylene. For example the sheet material may have 25% thermoplastic material and the thread more, possibly even 100%.

The thread may contain polypropylene in admixture with a further material which is not subject to melting at the melting point of the polypropylene, eg. a polyester having a melting point some 20° C. or more higher than the melting point of the polypropylene. The strength of the thread in the region of the heat seal can be improved this way. To ensure satisfactory heat sealing it is desirable that the thread is not coated with lubricants, as is commonly done in the production of thermoplastic filaments.

The surface of the tag facing the thread may be treated to be more receptive to bonding with the thermoplastic material of the thread. As examples, the surface of the tag facing the thread may have a coating of a thermoplastic material such as polypropylene or it may be roughened or made porous to facilitate the penetration of the heat-sealable thread material into the surface when the thread has been softened by heat.

Although the thread is held mainly underneath the tag before use, it may be preferred to weld it detachably to the body to ensure it does not become displaced inadvertently with the risk of snagging on extraneous objects. This can conveniently be done on the exposed portion of the thread loop below the tag.

The heat seals are achieved by separate sealing operations performed simultaneously between the thread and the body and between the two webs of the body to each side of the thread, as will now be described.

The apparatus takes the form of two circulating belts C1,C2 on which a series of heat seal operating members are secured, pairs of opposed members 2,4 on the two belts forming the heat sealing units. The belts extend on opposite sides of a path R along which sheet material of the bodies B enters as a continuous tubular web, being converted into partly completed packets P as they progress through the apparatus, still as a continuous web, and in this respect the belts with their operating members may be arranged similarly to the circulating heat sealing devices for performing the finishing web sealing and separating operations described in EP 448325, urgeing together correspondingly the heat seal operating members 2,4 to secure the thread to the web and to seal the ends of the web compartments. The drawings do not show the guides at the sides of the apparatus for guiding the web of uncompleted packets between the two belts.

Each member 2 of the lower belt comprises a lower mounting plate 6 through which it is attached to its belt and a lower heater element 8 and lower anvil element 10 which jointly extend over substantially the area of the mounting plate. The heater element and the anvil element lie close to one another but there is an air gap between them. Between the plate 6 and the elements 8,10 are a thermal insulating sheet 12 and for the heater element and/or the anvil element at least one radiating plate 14. Each radiating plate has essentially the same plan form as its associated element. The components of the operating member 2,4 are clamped together by bolts (not shown) between the lower plate 6 and the elements 8,10.

Each member 4 of the upper belt similarly comprises an upper plate 16 through which it is attached to its belt, an upper heater element 18 and closely nested anvil element 20, and an insulating sheet 22 and radiating plates 24 interposed between the plate 16 and the elements 18,20. The radiating plates 24 also have plan profiles matching those of their respective elements 18,20.

The lower heater element 8 comprises a pair of upwardly projecting heating jaws 32 at its nesting boundary with the lower anvil element 10 and a cartridge heater 34 inserted into the body close to the jaws 32. The lower anvil element 10 has a central upwardly projecting anvil jaw 36 between the heating jaws 32. The upper heater element 18 disposed opposite the lower anvil element 10 has a cartridge heater 38 inserted into its body close to a central, downwardly projecting heating jaw 40 which is vertically coincident with the lower anvil jaw 36. The upper anvil element 20 similarly has a pair of downwardly projecting anvil jaws 42 on opposite sides of the heating jaw 40 and vertically coincident with the lower heating jaws 32.

In this arrangement, the upper heating jaw 40 and lower anvil jaw 36 form one heat-sealing device for a central zone and immediately adjacent to them is a second heat-sealing device formed by the lower heating jaws 32 and upper anvil jaws 42 for a pair of outer zones aligned with the central zone. Heat transfer between the heating jaw or jaws of one device and the adjacent anvil jaws or jaw of the other device is limited by the air gaps between the adjacent elements.

Base projections 48 on each of the elements 8,10,18,20 limit the conduction of heat away from the heater and anvil elements. The radiating plates provide a means of dissipating heat that has been transmitted from the elements.

The web of partly formed packets is fed between the heat seal operating members as the belts C1,C2 circulate, the members being oriented parallel to each other before they contact the web so that they close together moving perpendicular relative to the web. The web feed is synchronised with the movement of the belts so that the portions to have end seals formed between the opposed webs of the individual packets, and one end of each packet thread, are brought into register with the jaws of the successive operating members 2,4.

The heat sealing of the thread to the web is performed by the central jaws 36,40 of the elements 10,18. That also seals together the two layers of the packet web in the immediate vicinity of the thread, but the main side zones are sealed by the pairs of outer jaws 32,42 of the elements 8,20 to complete the packet end seal. This arrangement allows different heating temperatures to be chosen for the different zones of the end seal, in particular the central zone with the thread may be heated more intensively. A small gap is present between the central jaws 36,40 but the outer jaws are set without a gap to clamp the web material between them under pressure.

It will be noted from FIG. 3 that the web of partly completed packets progresses through the apparatus with the tag and thread on its lower face. The heating in the central zone occupied by the thread is applied through the jaw 40 of the upper element 18, ie. the thread is heated through the web material. It is found that this procedure is able to soften the thread so that it can adhere to the web but it does not stick to the cooler anvil element. Nor need it be subjected to heating conditions which would cause it to melt and shrink away from the contacting element. The heater element 18 is raised to higher heating temperature than the heater elements 8. For example, the jaws 32 may be heated to 180° C. but although the thread may be weldable at a temperature of about 160° C. it may be necessary to heat the jaws 40 to some 300° C. to transmit sufficient heat through the web, but the process gives a more secure and reliable attachment for the thermoplastic thread.

A pair of cold rollers 49 in the path of the packet web following the belts have control rings (not shown) on their mounting shafts which set the arms 50 of the rollers at a fixed minimum gap, eg. 0.2 mm. The rotation of the rollers is synchronised with the belts so that the arms pinch the still soft thread at each end seal to spread and to solidify it. This final step ensures the thread is securely and permanently connected before the packets proceed to the next stage of processing.

We claim:

1. A method of attaching a thermoplastic thread to a web of a material having a minor constituent of thermoplastic material, comprising the steps of:

placing the thread against one face of the web, holding the thread and web between a pair of opposed sealing elements having a width greater than the thread and overlapping the thread at opposite sides thereof, said elements being thereby directed against said one face of the web and an opposite face of the web respectively, and applying heat from the sealing element on the opposite face of the web to the thread, thereby to render the thread plastic and cause it to adhere to the web, each sealing element being mounted on a support so as to define and maintain a predetermined gap between the sealing elements during the step of applying heat to the thread.

2. A method according to claim 1 wherein the step of applying heat to the thread is followed by a step in which the web and thread are pressed and cooled.

3. A method according to claim 2 wherein the web and thread are pressed and cooled by a pair of opposed cooling elements located a fixed distance apart to provide a predetermined size gap through which the web and thread pass.

4. A method according to claim 1 wherein the web comprises two layers of heat sealable material and said layers are heat sealed together in the region in which the thread is adhered to the web material.

5. A method according to claim 4 wherein said adhesion of the thread to the web material is isolated within a transverse seal area that extends across the width of the web, said sealing of the layers together in the region of adhesion of the thread forming a part of said transverse seal area and a transverse seal is completed in said transverse seal area by bringing the web between at least one further pair of opposed sealing elements directed against said one and said opposite faces of the web respectively in a region of said seal area spaced from the thread and applying heat to the transverse seal area between said at least one further pair of elements by inputting heat to one of the opposed elements of the or each said further pair of elements.

6. A method of attaching a thermoplastic thread to an outer face of two ply web of a material having a minor constituent of thermoplastic material, and simultaneously sealing the plies of the web together in a region that contains the attachment of said thread, comprising the steps of:

holding the thread and web between a pair of opposed sealing elements, said elements being thereby directed against said outer face of the web and a face of the web opposite thereto respectively, applying heat from the sealing element directed against the opposite face of the web to the thread, thereby to render the thread plastic and cause it to adhere to the web, the plies of the two ply web being simultaneously sealed together between the sealing elements, each sealing element being mounted on a support so as to define and maintain a predetermined gap between the sealing elements during said step of applying heat to the thread.

7. A method according to claim 6 wherein the step of applying heat to the thread is followed by a step in which the web and thread are pressed and cooled.

8. A method according to claim 7 wherein the web and thread are pressed and cooled by a pair of opposed cooling elements located a fixed distance apart to provide a predetermined size gap through which the web and thread pass.

9. A method of attaching a thermoplastic thread to a web having two superimposed layers of heat sealable material and comprising the steps of:

placing the thread against one face of a pair of opposite faces of the web, holding the thread and web between a pair of opposed sealing elements, directed towards said opposite faces of the web, applying heat to the thread from the element directed against that face of the web opposite said one face against which the thread is placed, thereby to render the thread plastic and cause it to adhere to the web material, and simultaneously adhering together the superimposed layers of web material between said elements, said adhesion of the thread to the web material being located within a transverse seal area that extends across the width of the web, a transverse seal being completed between the two superimposed web layers in said transverse seal area by bringing the web between at least one further pair of sealing elements in a region of said seal spaced from said adhesion of the thread.

10. A method of attaching a thermoplastic thread to a web having two superimposed layers of heat sealable material, a transverse seal area between said two superimposed layers extending across the width of the web and the thread being attached in a location within said seal area, the method comprising the steps of:

placing the thread against one face of a pair of opposite faces of the web in a first portion of the web width, holding the thread and web in said first portion of said web width between a pair of opposed sealing elements directed towards said opposite faces of the web, applying heat to the thread from the sealing element directed against that face of the web opposite said one face against which the thread is placed, thereby to render the thread plastic and cause it to adhere to the web material, and simultaneously adhering together superimposed layers of web material in said first portion of the web width, holding the two superimposed web layers in at least one further portion of the web width between at least one further pair of opposed sealing elements directed towards said opposite faces of the web and applying heat from one of said elements to cause the superimposed layers of heat sealable material between said further pair of elements to adhere together, said adhesion of the thread and superimposed layers being carried out simultaneously in said first and further portions of the web width, and said pair of sealing elements between which the thread is held being at a greater spacing from each other than said at least one further pair of elements at said at least one further portion of the web within.

11. A method according to claim 10 wherein, following the step of applying heat to the thread, said adhered thread and web material in said first portion of the web width is pressed and cooled in a gap of predetermined size between a pair of opposed cooling elements.

12. A method of attaching a thermoplastic thread to a web comprising the steps of:

placing the thread against one face of the web, holding the thread and web between a pair of opposed sealing elements having a width greater than the thread and overlapping the thread to opposite sides thereof, said elements thereby being directed against said one face and an opposite face of the web respectively, and applying heat from the sealing element on the opposite face of the web to the thread, thereby to render the thread plastic and cause the thread to adhere to the web, the web comprising two layers of heat sealable material and said layers being heat sealed together in a transverse seal area that extends across the width of the web, said adhesion of the thread to the web material being located within said transverse seal area, said sealing of the layers together in said transverse seal area being completed by bringing the web between at least one further pair of opposed sealing elements directed against said one and opposite faces of the web respectively in a region of said seal area spaced from the thread and applying heat to the transverse seal area between said at least one further pair of elements by inputting heat to one of the opposed elements of the or each said further pair of elements.

13. A method according to claim 12 wherein the web is in a continuous tubular form and the thread is extended along the web which is sealed transversely at intervals to define a series of separate compartments for forming discrete articles, each with the thread adhered thereto, and wherein in addition to said pair of opposed sealing elements for said adhesion of the thread, said at least one further pair of sealing elements is operated to complete the transverse seals at the same time as said adhesion of the thread.

14. A method according to claim 12 wherein the completion of said transverse seal by said at least one further pair of heat-sealing elements is effected by applying heat from the element of said further pair of elements that is directed against said one face of the web.

\* \* \* \* \*